US010767822B2

(12) United States Patent
Munari

(10) Patent No.: US 10,767,822 B2
(45) Date of Patent: Sep. 8, 2020

(54) AUTOMATIC LIGHT CONTROL FOR ILLUMINATION OF A FEATURE OF INTEREST

(71) Applicant: Brian Munari, Alpharetta, GA (US)

(72) Inventor: Brian Munari, Alpharetta, GA (US)

(*) Notice: Subject to any disclaimer, the term of this patent is extended or adjusted under 35 U.S.C. 154(b) by 250 days.

(21) Appl. No.: 15/192,393

(22) Filed: Jun. 24, 2016

(65) Prior Publication Data
US 2017/0367785 A1 Dec. 28, 2017

(51) Int. Cl.
F21S 8/02 (2006.01)
H05B 45/10 (2020.01)
H05B 45/20 (2020.01)
H05B 47/11 (2020.01)
H05B 47/19 (2020.01)
H05B 47/105 (2020.01)
F21W 131/202 (2006.01)
F21Y 115/10 (2016.01)
F21V 13/04 (2006.01)
F21V 23/04 (2006.01)

(52) U.S. Cl.
CPC .............. *F21S 8/026* (2013.01); *H05B 45/10* (2020.01); *H05B 45/20* (2020.01); *H05B 47/105* (2020.01); *H05B 47/11* (2020.01); *H05B 47/19* (2020.01); *F21V 13/04* (2013.01); *F21V 23/0478* (2013.01); *F21W 2131/202* (2013.01); *F21Y 2115/10* (2016.08)

(58) Field of Classification Search
CPC . A61C 1/088; A61B 1/06; A61G 15/02; F21S 8/026; F21S 8/044; F21V 5/04; F21V 9/04; F21V 9/08; H05B 33/0854; H05B 33/0872; H05B 37/0218; H05B 37/0227; H05B 37/0272
See application file for complete search history.

(56) References Cited

U.S. PATENT DOCUMENTS

| 5,003,434 | A | * | 3/1991 | Gonser | A61C 1/088 |
| | | | | | 362/119 |
| 2008/0063998 | A1 | * | 3/2008 | Liang | A61B 1/0638 |
| | | | | | 433/29 |
| 2013/0310652 | A1 | * | 11/2013 | Barsoum | A61B 90/30 |
| | | | | | 600/249 |

(Continued)

*Primary Examiner* — Amr A Awad
*Assistant Examiner* — Jonathan G Cooper
(74) *Attorney, Agent, or Firm* — Thomas Horstemeyer LLP

(57) ABSTRACT

Various examples related to automatic light control for illumination of a feature of interest are presented. A lighting system can automatically track a feature of interest, and/or a target positioned in relation to a feature of interest, and position one or more light sources to maintain illumination of the feature of interest. The location of the target, or the feature of interest, can be tracked using images captured by an image capture device and the orientation of one or more light sources can be adjusted to direct beams of light at the feature of interest. The beams of light can produce substantially shadow free illumination of the feature of interest. The controller can automatically calibrate a light source based on identifiable features within a captured image to ensure accurate movement of the light sources when tracking the target or feature of interest in or near real time.

20 Claims, 5 Drawing Sheets

(56) References Cited

U.S. PATENT DOCUMENTS

| | | | | |
|---|---|---|---|---|
| 2014/0275806 | A1* | 9/2014 | Gunday | ............... A61B 1/0669 600/249 |
| 2014/0335469 | A1* | 11/2014 | Boyden | ............... A61B 5/4803 433/27 |
| 2016/0227992 | A1* | 8/2016 | Yoshino | ................... A61B 1/06 |
| 2016/0338803 | A1* | 11/2016 | Pesach | ................. G06T 1/0007 |

* cited by examiner

AUTOMATIC LIGHT CONTROL FOR ILLUMINATION OF A FEATURE OF INTEREST

BACKGROUND

In the dental industry, overhead lights, also known as operatory lights, lamps, or luminaires, are often used to illuminate the mouth, or oral cavity, of a patient while dental procedures are being performed. The almost universal practice is for the dentist to employ a movable light source mounted on a supporting arm structure which permits the light to be positioned relatively close to the patient. Such conventional lighting systems clutter up the space about the patient, dental chair, and operatory, and may require frequent repositioning by the dentist each time the dentist, the patient, and/or the chair moves. Stopping to make such adjustments takes the attention of the dentist away from the more important task at hand. In addition, each time the overhead light is repositioned, the dentist must reach up and grab the handles of the light to move it. This can contribute to repetitive strain injuries and creates an unsanitary condition due to the high potential for germ transfer on the handles of the light.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
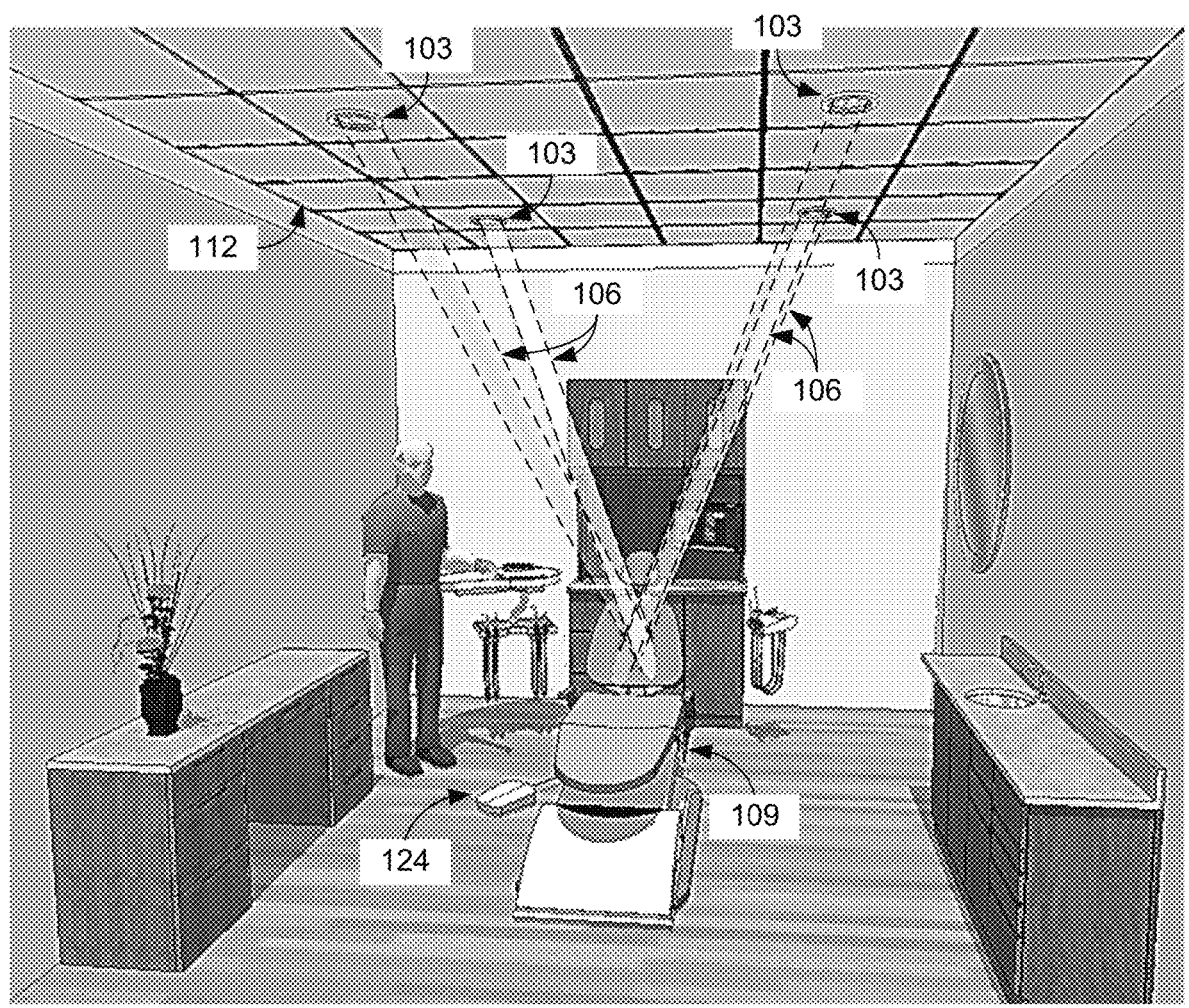
FIGS. 1A and 1B illustrate an example of a lighting system that automatically controls the lighting to illuminate a feature of interest, in accordance with various embodiments of the present disclosure.

Overhead lights can be used to assist in the examination and diagnosis of patients. In a dental setting, this can include tooth reduction and preparation, color-shade matching tooth fillings, restoration, and/or oral tissue examination, to name a few. In these types of procedures, it is advantageous to utilize lights that are bright, uniform, color corrected, and essentially shadow free. In addition, it is also important that the dental professional or physician has the ability to easily and conveniently adjust the lights to vary the intensity, focus, color, and/or the directional aspects of the light. Proper illumination makes it possible to see the clinical field clearly, assess patient needs, and deliver quality care. Inadequate lighting can lead to eyestrain, postural compromise, missed diagnosis, and poor quality clinical treatment.

Conventional overhead lighting systems generally include a light on the end of a supporting arm structure with multiple pivot points that allows the light to be positioned at a certain distance and in a certain location proximal to the patients' head depending on the procedure to be carried out. When the light is positioned as such, it only provides illumination at one fixed angle. As a result, the dentist or physician must manually reposition the lamp to change, improve, or maximize the illumination as needed during the procedure. Should the dentist need illumination in a different part of the oral cavity, the position of the light can be readjusted, or the dentist may ask the patient to turn their head, or the dental chair in which the patient is situated may be adjusted, or a combination thereof may be carried out, to achieve the desired effect. Because of their design, conventional overhead lighting systems can be difficult to adjust with respect to intensity and/or position and may inconvenience medical personnel who must move to a different location in the operatory to accomplish the needed adjustment.

Further, since the illumination provided inside the oral cavity is all received through the comparatively small opening of the mouth, focus and control of the light is important. To accomplish this, conventional lighting systems employ the use of large reflectors with a generous radius in an attempt to minimize shadowing while at the same time providing the operator the ability to focus the light on the feature of interest to be illuminated. For example, in a dental setting, conventional lights are typically positioned about 24 inches away from the oral cavity of the patient. As the design radius of the light source is increased to further minimize shadowing, the dental light will then exhibit increased position sensitivity as a result of the cone shape of the reflected light. The beam pattern size, or focus, becomes more sensitive to changes in the distance between the light source and the illumination plane at the feature of interest. For example, small changes in this distance can produce large variations in the beam pattern size. Additionally, as the beam pattern size increases, the brightness will decrease.

Still further, because a patient's eyes are located close to the oral cavity, it is desirable for the light to be directed and shaped so as to reduce or prevent the light from shining in the eyes to reduce glare and patient discomfort. The International Organization for Standardization (ISO 9680:2014) specifies requirements and test methods for operating lights used in the dental office and intended for illuminating the oral cavity of patients. This standard requires that the illuminance at 60 mm from the center of the illuminated region along the illuminance plane (and towards the patient's eyes) be less than 1,200 lux. A patient may become annoyed or suffer from flash blindness if the light accidentally shines in their eyes when the light is manually repositioned. This can easily occur as a result of human error when adjusting a conventional overhead operatory light.

Still further, conventional overhead lighting systems require frequent repositioning by the dentist, hygienist, or assistant and can lead to repetitive strain injuries as a result of the repetitive motion induced in the musculoskeletal system. According to the five classifications of motions for dental professionals, adjusting a conventional overhead operatory light qualifies as a Class 4 motion which includes the movement and use of the entire arm including fingers, wrist, elbow, and shoulder. Conventional dental lighting systems are frequently repositioned during the progress of dental and surgical operations and procedures. To reposition the dental light, the dentist, hygienist, or other professional must stop performing work on the patient, may put down any tools they are currently holding, and reach up to adjust the light. This process is repeated multiple times during each procedure every time a light adjustment is required. The handles of conventional lights may be designed with large grips, perhaps with a rubberized surface, to facilitate movement of the light. While handle shape, design, and materials may attempt to alleviate hand strain and fatigue, manual adjustments will always pose some level of musculoskeletal burden on the operator each time the light is moved or repositioned.

Still further, conventional dental operatory lamps have a supporting arm structure to allow the light be moved or pivoted into a variety of positions. The supporting arm structures are bulky, costly, take up considerable space in the operatory, and can interfere with personnel and/or patient movement into, out of, and around the operatory. In certain circumstances, the supporting arm structure interferes with other devices and equipment in the operatory which may also rely on a supporting arm structure for movement and positioning, i.e. an x-ray machine. Conventional overhead lighting systems and their related supporting arm structures clutter the room, or operatory, in which the medical or dental procedure is being performed. In some installations, large cabinets are built to house the lighting system and corresponding supporting arm structure when it is not in use. This consumes valuable space within the operatory.

Still further, manual repositioning of conventional overhead lights creates an unsanitary condition due to the high potential for germ transfer on the handles of the light. In an attempt to address this situation, the handles of conventional dental lighting systems have been designed to permit cleaning, to facilitate placement and removal of germ barriers, and/or to be disconnected for sanitizing. This can be a time consuming process for the dental professional that consumes valuable resources on behalf of the business. For example, in addition to a dental assistant performing the work of cleaning the light, sanitizing and sterilizing equipment must also be purchased and maintained, and certain cleaning and sterilizing supplies such as cleaning fluids, germ barriers, and the like, must also be stocked. In short, cleaning, sanitizing, and sterilizing the dental lighting system is a non-value added process that dental professionals perform after each and every patient to ensure a germ free environment for themselves, their staff, and their patients. While these cleaning methods are considered by many in the industry to be "best practice", it is not 100% effective at preventing the spread of disease.

Still further, when shadows are cast onto the working surface, a dentist may reposition herself in such a manner as to be disposed between the light source and the patient. While this may minimize the impact of shadowing from the perspective of the dentist, it also results in a partially blocked light beam projected by the lighting source. Thus, the efficiency of a conventional lighting system is impaired because all of the light from the source does not reach the oral cavity.

Still further, conventional dental lights have an oval or rectangular-shaped beam pattern at the illumination plane to account for movement of the patient. In general, dental operatory lamps have a light pattern that is 6 inches by 9 inches. Distributing the light pattern in this way compensates for movement of the patients' head, mostly from side to side, so that the light position doesn't need to be readjusted as often. However, designing the light pattern to intentionally cover a larger area than needed diminishes the total overall brightness by spreading the same amount of light over a much larger area. As a result, the radiance of the lighting element is increased to compensate for the light that is lost in the unused areas on each side of the oral cavity.

Still further, conventional dental lights are designed without active cooling systems, such as fans, blowers, or air vents. Completely sealed, fully enclosed systems, are preferred by dental professionals because they help reduce the possibility of contamination and damage to the optical and electrical components contained therein from dust, fluids, or cleaning chemicals. As a result, conventional operatory lamps heat up during use because of their small size, relatively high operating temperatures, and limited passive heat dissipation designs. This can make the light hot to the touch and can also require the ventilation cooling system of the entire operatory to be set at a lower temperature to counteract the heat that is generated and added to the room by the conventional operatory light.

Still further, conventional dental operatory lamps also need regular preventative maintenance to ensure that the joints, bearings, supporting arm structures, moveable parts, and pivot points remain in proper working order. As the supporting arms wear and age, the light will drift or sag from the position in which it is placed which can result in the dental professional continuously repositioning the light during a procedure. Conventional dental lamps also have a tendency to move, bounce, or vibrate. For example, chair mounted lights have a tendency to move and vibrate whenever the chair is moved or the patient shifts position in the chair.

Still further, conventional dental lights must provide power, as well as any related control signals, to and from the end of the supporting arm structure where the light is mounted. The power and control signals are carried on wires from the light head unit, through the supporting arm structure, to the base of the unit where the power electronics and control systems are located. These types of lighting systems are subject to the risk of wire failure due to the repetitive bending of wires as they pass from the light head unit into the supporting structure or pivot arm. Every time the light is adjusted or repositioned, the wires are moved, flexed, and bent. Over time, after numerous bending and flexing motions, these wires can yield and fail resulting in an open circuit. Another failure mode is that the wires will rub against a surface of the light head unit or supporting structure, eventually wearing away the protective coating on the wire. This exposes the conductive core of the wire, which can rub against a metal surface to the point where an electrical short to ground results.

Many of the limitations of conventional lighting systems described herein can be reduced or eliminated by utilizing a lighting system that automatically controls the lighting to illuminate a feature of interest. Disclosed herein are various embodiments of systems and methods related to a lighting system which can be used to automatically track a target or feature of interest and provide one or more beams of light for the illumination of the feature of interest to facilitate dental, medical, surgical, or other procedures. The light sources can be located and positioned above an operating chair or table so as not to interfere with the movements of the dentist, physician, assistants, or patient about the operatory. The light sources can be controlled automatically to avoid the need for attention or manual intervention by the dental or medical professional. The light sources can be designed to automatically provide intense beams of bright, uniform, color corrected, and substantially shadow free light projected toward the center of an oral cavity or other feature of interest. Reference will now be made in detail to the description of the embodiments as illustrated in the drawings, wherein like reference numbers indicate like parts throughout the several views.

Referring to FIG. 1A, shown is an example of a lighting system comprising multiple light sources 103 (e.g., ceiling mounted fixtures) that focus beams of light 106 on a feature of interest, e.g., the oral cavity of a person sitting in a dentist chair 109. The automated lighting system with a plurality of lights mounted to the ceiling 112 at different locations about the feature of interest can provide substantially shadow free illumination. In addition, position sensitivity can be eliminated because there is no "cone of light" to adjust towards or away from the patient or feature of interest. In contrast, the beam of light 106 is nearly linear from the source all the way to the oral cavity and the light beams 106 produced by a light source 103 can be individually and automatically adjusted to maintain the intensity of the illumination at the feature of interest.

The automated lighting system can eliminate the need to manually adjust the light sources, thus eliminating any contribution to hand fatigue, musculoskeletal strain, or repetitive stress injuries. Utilizing an automated lighting system that tracks the movement of the feature of interest, the dental professional does not need to stop in the middle of a procedure to adjust the light source 103. The beam of light 106 will automatically move and adjust, illuminating the oral cavity of the patient, even as the patient moves their head and as the chair position is adjusted by the dentist. The hands-free lighting system has no handles and therefore needs no sanitizing. This saves the dental professional extra steps in cleaning and preparing the operatory between patients and reduces the cost burden of cleaning supplies and protective germ barriers.

By locating the light sources 103 in (or adjacent to) the ceiling 112 of the room (e.g., dental operatory or operating theater), movements of the dentist, physician, patient, or others will not be obstructed by the equipment of the lighting system. The illumination provided by the beams of light 106 can be controlled by tracking a target or a feature of interest and automatically adjusting the light beams 106 accordingly. Adjustment of the beams of light 106 can include, but are not limited to, changes in direction, focus, intensity, color temperature, or any combination thereof.

In one embodiment, the light source 103 is a single light mounted to the ceiling 112. The light source 103 may be recessed into the ceiling 112 such that it appears similar to that of a recessed light as illustrated in FIG. 1A. In another embodiment, the light sources 103 are a plurality of light sources 103 mounted to the ceiling 112, or recessed into the ceiling 112, and placed strategically such that the resultant beams of light 106 will provide exemplary lighting for the oral cavity or other feature of interest while minimizing shadowing. For example, four or more light sources 103 can be positioned to provide illumination of at least the upper right, upper left, lower right, and lower left quadrants of the oral cavity. The light sources 103 can be distributed (e.g., equally distributed) about the feature of interest or an expected location of the feature of interest. While the light sources 103 can be mounted to the ceiling 112, they may also be mounted in such a way as to permit their movement or adjustment should it become necessary. For example, the light source(s) 103 can be mounted on a bracket system, mounting track, or other support system secured to the ceiling 112 or walls.

Figure 1B:
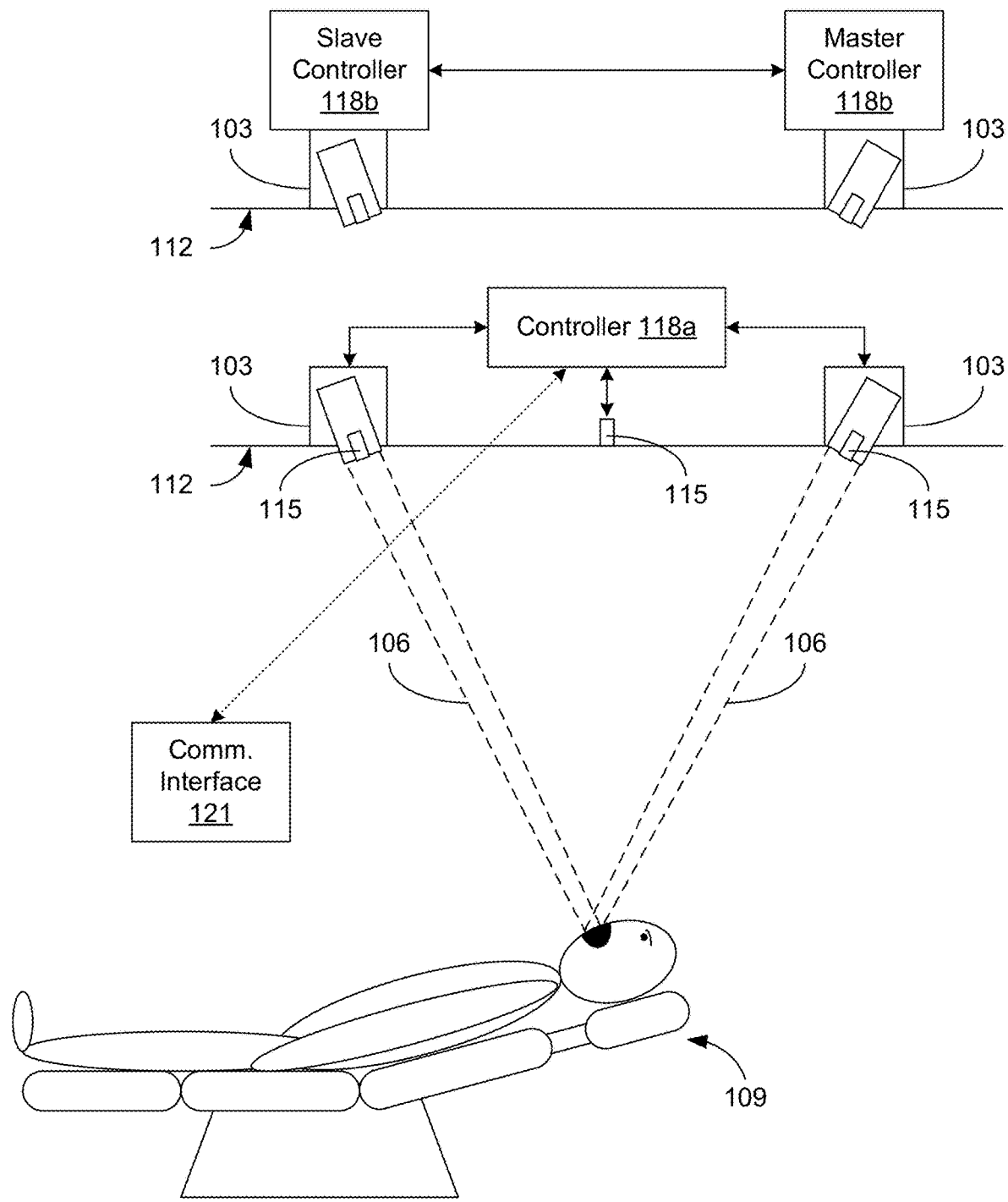

Referring next to FIG. 1B, shown is a simplified representation of the lighting system of FIG. 1A. One or more cameras (or other image capture devices) 115 can be used to monitor and track activity in the area being illuminated by the lighting system. The cameras 115 can be integrated into (or attached to) one or more of the light sources 103, or can be independently mounted at various locations in (or adjacent to) the ceiling 112 of the room (e.g., on a wall adjacent to the ceiling 112), or a combination thereof. Images captured by the cameras 115 can be evaluated to identify objects or individuals in a region of interest (e.g., a dental operatory, operating theater, or other room) and/or determine the location of a target or a feature of interest. The images can also be evaluated to determine potential interference from the individuals moving in the vicinity of the feature of interest.

The lighting system can include one or more controllers 118 that can be configured to provide automated control of adjustable parameters of the light source(s) 103 such as, but not limited to, turning the light on and off, adjusting the direction of the light, adjusting the focus of the light, adjusting the illumination intensity level (brightness, dimming) of the light, and/or adjusting the color temperature of the light for shade matching or for working with composites. In some implementations, a central controller 118a can be configured to control the operation of the light source(s) 103. In other embodiments, each light source 103 can include a controller 118b that controls the operation of that light source 103. In some embodiments, the controllers 118b can operate independently to illuminate the feature of interest, while sharing their location information with the other controllers 118b. In alternate embodiments, the controllers 118b can be communicatively coupled (either wired and/or wirelessly) to operate in a master-slave configuration as illustrated in FIG. 1B. In some cases, the individual controllers 118b can be communicatively coupled to a central controller 118a that can act as the master controller. The automatic control of the light sources 103 can reduce or eliminate the need for personnel to manually manipulate the lights by hand. When multiple light sources 103 are utilized, all of the light sources 103 can be communicatively coupled via wireless or wired connections in order to synchronize their operations via the controller(s) 118.

The lighting system can be configured to allow a user to provide an input to the controller(s) 118 via one or more communications (or control) interface 121. For example, the user can provide inputs to control the lighting system through a foot pedal controller 124 (FIG. 1A), a chair-mounted control panel, a wall switch or wall mounted control panel, a hand-held remote control, computer, other appropriate communications interface 121 known in the art for facilitating user control of a system, or a combination of these communications interfaces 121. In some implementations, the communication interface 121 can be a mobile device such as, e.g., a smart phone, tablet, laptop, or other portable electronic device executing an application configured to facilitate communication between the user and controller(s) 118.

Figure 2A:
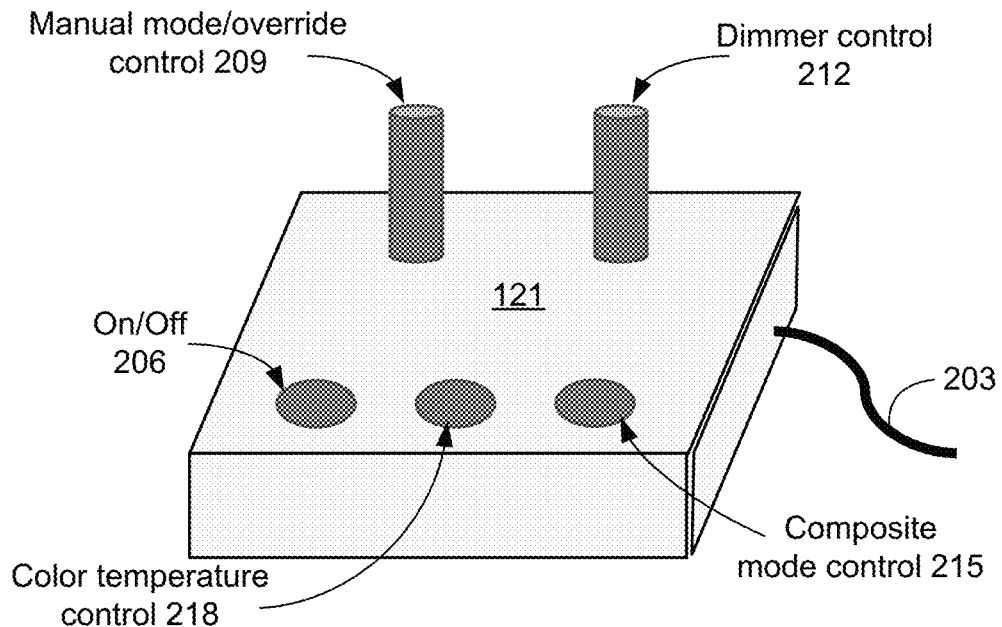
FIGS. 2A and 2B illustrate examples of a communications interface and a controller of the lighting system of FIGS. 1A and 1B, in accordance with various embodiments of the present disclosure.

In some embodiments, the communications (or control) interface 121 can be configured to communicate with all of the controllers 118, which may be individually controlled. FIG. 2A is a graphical representation illustrating one example of a communications interface 121 such as, e.g., a foot pedal control panel. The communications interface 121 can include one or more interfaces that facilitates wired and/or wireless (e.g., Bluetooth®, WiFi, etc.) communications with the one or more controllers 118 and/or other communications interface(s) 121. For example, a cable connection 203 can be provided to facilitate communication of control signals to a controller 118 and/or provide power for operation of the communications interface 121. Various knobs, buttons, touch-screens, etc., can be provided to allow for user input and control. For example, an on/off switch 206 can be provided to allow the user to power up or power down the lighting system. In addition, a manual mode or override control 209 can be provided to allow the operator to switch between automatic and manual control of the lighting system, allowing the operator to manually control the position or orientation of the light sources 103.

The communications interface 121 can include a manual dimmer control 212, in addition to an automatic dimmer control, that can be used to adjust the intensity of the light provided by the light sources 103. The viewing comfort of the dental professional can be enhanced when the illumination of the surgical suite is precisely controlled to provide just the right amount of intensity and/or brightness levels for the procedure at hand without causing undo eye strain. The operator may adjust the brightness of the illumination at the feature of interest to their liking by utilizing a dimmer switch such as a control knob or slider, touch-screen interface, or other appropriate control input. If a foot control dimmer switch is used, the operator can adjust the brightness of the light without having to stop the procedure in process and without having to put down any instrumentation being used. By avoiding the need to touch any surfaces with their hands, the dentist or physician can save time and prevent germ transfer.

The communications interface 121 can also include a composite mode control 215. Composite materials used in some dental procedures cure or harden when exposed to specific frequencies of light (e.g., in the 430 to 470 nm wavelength range). Removing or filtering this wavelength of light from the light beams 106 permits a dental professional more time to work with the composite materials before they begin to harden. The composite mode control 215 can allow the operator of the lighting system to switch between a composite-safe mode, where the hardening frequencies are filtered out (e.g., by a blue filter), and a normal mode where these frequencies are not removed from the light provided by the light sources 103. The dentist can activate this mode, for example, by pressing a button on the communications interface 121 to enable and disable composite-safe mode. An indication of the current composite mode may be provided through the communications interface 121.

The communications interface 121 can also include a color temperature control 218 which can provide the ability to vary or change the color temperature of the beams of light 106. The color temperature of a light source 103 is the temperature of an ideal black-body radiator that radiates light of a comparable hue. For example, sunlight has a color temperature of approximately 5,780 Kelvin at sea level. When dental professionals are filling a tooth that is visible when someone smiles, they are inclined to ensure the filling material they select will match the natural shade of the tooth so that it will blend in and not be noticeable. To obtain the best possible match, the filling material and tooth are typically observed under various color temperatures of light. For example, a dentist may select a shade of filling material while first observing the tooth under the ambient lighting of the room. Then, to confirm the selection, the dentist may walk with the patient over to a window or to a different light source 103 to verify that the shade they have selected is an appropriate match. The lighting system can include a built-in shade matching feature where the color temperature of the light from the light sources can be varied by the operator. For example, varying the color temperature down to 3,000 Kelvin will produce a warm, reddish light while increasing the color temperature up to 7,000 Kelvin will produce a cool, blueish light. The color temperature control 218 can be used to help dental professionals ensure proper shade matching with minimal effort. The color temperature control 218 can be a switch to toggle between two or more predetermined or configurable color temperature settings, or it could be a dimmer-like control knob or slider that allows the operator to fade or blend from one color temperature to another in a continuous fashion. An indication of the current color temperature may be provided through the communications interface 121.

The user may be able to provide the inputs via voice activation, gesture activation, a series of buttons or knobs, an interactive display, a mouse, a keyboard, or other appropriate interface features. For example, one or more cameras 115 can be used to monitor gestures or movements of one or more users to control the lighting system. These can include the cameras 115 installed in (or adjacent to) the ceiling 112 and/or a camera integrated into a communications interface 121. For instance, a camera in a smart phone or tablet operating as a communications interface 121 can be used to monitor the movements of a user for gesture activation of the lighting system. Known or defined gestures or movements may be identified by the lighting system and used to activate and/or control the light sources 103. The controller 118 may be configured to identify a specific user and operate only in response to gestures or movements from that individual. In addition, one or more microphones (not shown) can be installed in a light source 103, in the ceiling 112 or in a communications interface 121 to monitor the speech of a user for voice activation of the lighting system. Known or defined voice commands may be identified by the lighting system and used to activate and/or control the light sources 103. The controller 118 may be configured to identify a specific user's voice and operate only in response to voice commands from that individual.

The lighting system has the ability to detect the location of a target or feature of interest within an image captured by an image capture device 115, which can include cameras configured to capture visible light images, infrared images, or other types of images or combination of images. The target or feature of interest can be a feature of the patient's face, such as the eyes, nose, mouth, some combination thereof, or can be some other feature of the patient. For example, the feature of interest may be the mouth or oral cavity during a dental procedure as illustrated in FIG. 1B. In other situations, the feature of interest may be one or both eyes for an ophthalmologist, or the nose or nasal cavity for an otolaryngologist. The feature of interest of a patient can be identified using, e.g., facial recognition or other image feature or object identification methods. Once the target or feature of interest has been identified by the controller 118, the lighting system can direct one or more beams of light 106 from one or more light sources 103 at the feature of interest.

The target can be an object or visual identifier that is placed on or near the feature of interest. For example, the target can be a pair of sunglasses that the patient wears, one or more dots placed in the vicinity of the feature of interest (e.g., on the forehead or nose), or some other item or items that can be used for location identification. The use of a known target can improve the identification and tracking of the feature of interest by the controller 118. The feature of interest and its relationship (or orientation) with respect to the target can be identified using, e.g., facial recognition, object detection, or other feature identification methods. The relationship between the target and the feature of interest may be pre-determined, programmable, or may be determined by the controller 118. The location of the target can be tracked and the relationship (or orientation) used to adjust the position of the light sources 103 so that the correct area at or around the feature of interest remains illuminated.

The controller 118 of the lighting system can also provide the ability to automatically calibrate the light sources 103 for use. The direction of the projected beam of light 106, with respect to the depth and location of a target or a feature of interest, can be determined by automatic calibration. Calibration can be accomplished using a variety of methods including but not limited to, measuring the size and location of a spot of light, measuring the size and location of a known object, binocular vision, or triangulation. Based on the calibration results, the variables for depth, focus, and/or movement increments of one or more of the light sources 103 can be determined and/or adjusted.

Automatic calibration may be accomplished by projecting a beam of light 106 from a light source 103 with a predetermined direction, focus, intensity, and color. One or more images of the spot of light formed by the beam of light 106 can be obtained by one or more of the cameras 115 and used to determine characteristics and/or dimensions of the light spot such as the diameter (or radius) and/or intensity of the light spot and the location of the light spot with respect to the target. For example, by measuring the diameter of the light spot with a known focus, the depth of the field of view can be calculated and stored as a variable for use by the controller 118. Similarly, knowing the direction and distance that the light spot (or the center of the light spot) is offset from the target or feature of interest, the light source 103 can then be adjusted to automatically center the light beam 106 onto the feature of interest.

Automatic calibration may also be accomplished by detecting the size and location of a known target or object such as a pair of sunglasses that a patient is wearing. Similar to the spotlight method, the location, orientation, and size of the known target or object can be measured and compared with the location of the spot light to determine the offset value which can be stored as a variable for use by the controller 118. The controller can then automatically center the beam of light onto the target or feature of interest using the measured offset.

Automatic calibration may also be accomplished by binocular vision or triangulation. Using the information provided by two or more cameras, the depth of the field of view, the target, and/or the feature of interest can all be determined using binocular vision or triangulation utilizing the overlapping fields of view of two or more cameras to permit depth perception measurements which are then stored as variables for use by the controller 118.

Automatic calibration may also be accomplished by utilizing an image captured from a single camera. Properties of the camera lens such as the focal length, refractive index, curvature radius, and thickness permit the calculation of the distance of a known object in the image, such as a target or feature of interest. For example, if a pair of sunglasses are used as a target, the dimension of the sunglasses in the image can be measured. This dimension can then be combined with the properties of the camera lens to calculate how far the object was from the camera lens when the picture was taken. Orientation information (e.g., rotation) can also be determined to calculate how the camera is oriented with respect to the known object or feature of interest. Further, perspective (e.g., tilt or angle) information of the object or feature of interest can also be calculated if the object is not directly facing the camera.

Automatic calibration may be carried out on a predefined schedule (e.g., continuously, daily, weekly, monthly, etc.). The automatic calibration of the lighting system eliminates the need to perform manual calibration during a setup period when the system is initially installed, or during the operational life of the lighting system. Automatic calibration also eliminates the need to perform a manual re-calibration after any field service work, when changes occur in the region of interest, or if a light source 103 or camera 115 is bumped or moved from its original installation position. As a result, no specialized skill or training is required or necessary for installation of the lighting system.

Knowing the depth and position of the target with respect to the light source 103 permits the controller 118 to automatically determine the direction, the amount of movement, and the focus corrections needed to adjust the light source 103 to maintain the light beam 106 on the feature of interest while it is moving in three-dimensional (3D) space. The amount of movement, e.g. step size, of the light fixture or the mirror which is needed to track the feature of interest will vary with the depth of the feature of interest. For example, if a feature of interest is close to the light source (e.g., 6 feet away) and moves a specific distance (e.g., 1 foot from left to right), the light source will need to move the beam of light a certain distance to track the feature of interest. If that same feature of interest is located 10 feet away from the light source, and moves the same 1 foot distance from left to right, the light source will not have to move the beam of light as far to track the feature.

Automatic calibration also allows the controller 118 to adjust the focus of the beam of light 106 so that the correct area at or around the feature of interest remains illuminated, as well as allowing the movement control to be adjusted as the feature of interest moves towards or away from the light source 103. The depth information allows the light beams 106 to be properly focused on the feature of interest and allows the fixtures to be properly adjusted to keep the illumination trained on the feature of interest with a high degree of precision as the feature of interest moves.

When using a plurality of light sources 103, the light beams 106 can substantially overlap at the feature of interest and the mixing of such lights can produce a homogenized beam at the illumination plane. That is, the color of the light, brightness, and intensity of the combined beams of light 106 are substantially uniform throughout the entire illuminated area at the illumination plane. In general, the illumination shall be sufficiently bright to support the procedure being carried out. For example, the combined light beams 106 shall be sufficiently bright to allow dental diagnosis and treatment. The beams of light 106 can be controlled to meet the guidelines provided by ISO 9680:2014 dentistry standard for operating lights, irrespective of the technology of the light source.

The movement and direction that a light source 103 needs to travel in order to automatically reach and track the target or feature of interest can be calculated using the determined 3D information (depth, location, direction, etc.) of the illumination space. When multiple light sources 103 are used, the corresponding 3D information can be different for each light source 103 because of the different spatial relationships between that light source 103 and the target or feature of interest. Depending on the system implementation, controllers 118 of the plurality of light sources 103 can independently determine the adjustment needed to track the target or feature of interest, or the central controller 118*a* or master controller 118*b* can determine and coordinate adjustment of the light sources 103.

The image capture devices (cameras) 115 can provide images to one or more of the controllers 118 to identify and track the location of the target or feature of interest. For instance, some or all of the cameras 115 can provide images directly to the central controller 118*a* to be processed and analyzed to identify the target or feature of interest using, e.g., facial recognition, or other image feature identification methods. In other implementations, a camera 115 mounted on or associated with a light source 103 can provide images to the controller 118b of that light source 103. The images can be processed and analyzed to identify the target or feature of interest by that controller 118b, which is then communicated to a master controller 118b or central controller 118a for processing and analysis, or a combination thereof. Information regarding the identified target or feature of interest that is determined by one of the controllers 118 may be communicated to one of more of the other controllers 118.

The image capture devices (cameras) 115 can be distributed about the region of interest to provide a continuous view of the target or feature of interest from at least one of the cameras 115. If one or more of the cameras 115 have an obstructed view of the feature of interest, the remaining cameras 115 can continue to track the target or feature of interest. As long as at least one camera 115 maintains a line of sight to the target or feature of interest, the images from that camera 115 can be used by the controller 118 to track the target or feature of interest and synchronously control all of the light sources 103. With the cameras 115 mounted on or near the light sources 103, the likelihood of all cameras being obscured can be minimized. For example, one, two, or three of the beams of light 106 could be partially or completely blocked in a 4 light system, but all 4 lights could still track the target or feature of interest together.

In addition, the images can be used to track movement of objects or individuals in the vicinity of the feature of interest such that their location can be used to determine whether a beam of light 106 from one or more of the light sources 103 is or will be blocked. If one or more of the light sources 103 or cameras 115 have an obstructed view of the target or feature of interest such that its field of view or beam of light 106 is either partially or entirely blocked, the remaining light sources 103 can be coordinated to continue to illuminate the feature of interest. The illumination provided by the obscured beam of light 106 can be compensated for by the remaining unobscured light beams 106. In some cases, the light source 103 providing the obscured beam of light 106 may dim or lower the intensity of its light, or even de-energize itself, to reduce or minimize the effects of shadows. Likewise, the intensity of the remaining lights can be increased to maintain a constant combined intensity at the feature of interest. As the light source 103 becomes unobscured (e.g., the individual moves out of the line of sight), then the light source 103 can increase the intensity of the beam of light 106, while reducing the intensity of the other light beams 106 in a coordinated fashion, to maintain a substantially constant and shadow free illumination at the feature of interest.

In some implementations, the controller 118 may delay adjusting the intensity to avoid unnecessary cycling the light sources 103 as a person moves out of and back into the line of sight of a light source 103. Consider a dentist who is blocking one of the light sources 103 during a procedure. That light source 103 can be dimmed or de-energized to avoid shadows as the dentist moves about during the procedure. If the dentist moves aside, the controller 118 can wait for a predefined or configurable period of time before adjusting the intensity of the light sources 103 to make sure that the dentist is not returning to the same position. For instance, if the dentist moves as he reaches for an instrument and then quickly returns to his previous position, the light sources 103 are not adjusted to prevent shadows or light fluctuations that would be noticed by the dentist. If the dentist does not return to the same position within the prescribed period of time, then the controller 118 can increase or decrease the intensities of the light sources 103 to provide an even illumination that is substantially shadow free.

Figure 2B:
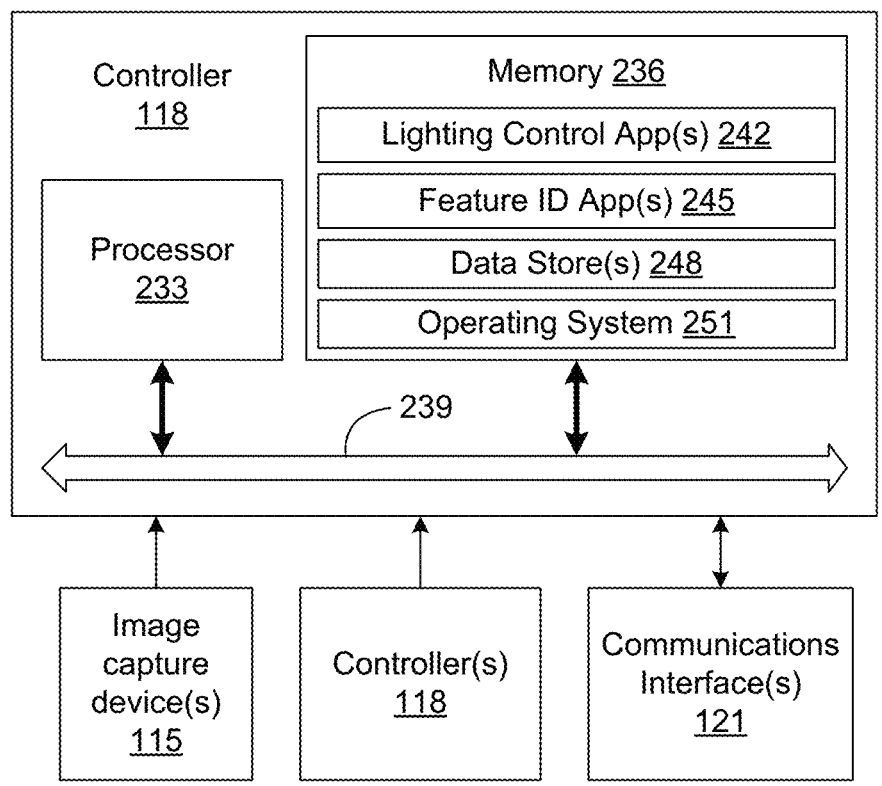

Referring to FIG. 2B, shown is an example of a controller 118 comprising processing circuitry that can be used to analyze the images from the image capture devices 115 of FIGS. 1A and 1B and/or control the operation of one or more light sources for calibration and/or identification and tracking of a target or feature of interest. The controller 118 can include at least one processor circuit, for example, having a processor 233 and a memory 236, both of which are coupled to a local interface 239. To this end, the controller 118 may comprise, for example, a computer, programmable logic controller, microcontroller, or like processing device. The local interface 239 may comprise, for example, a data bus with an accompanying address/control bus or other bus structure as can be appreciated. In addition, the controller 118 can include an operator interface such as, e.g., a display, a keypad or keyboard, and/or other interactive interface. In some implementations, the operator interface may be an interactive display (e.g., a touch screen) that provides various functionality for operator interaction with the controller 118. The controller 118 can interface with one or more image capture device(s) 115, one or more other controller(s) 118 and/or one or more communications interface(s) 121. The controller 118 can include one or more interface that facilitates wired and/or wireless (e.g., Bluetooth®, WiFi, etc.) communications with the image capture device(s) 115, controller(s) 118, and communications interface(s) 121.

Stored in the memory 236 can be both data and several components that are executable by the processor 233. In particular, stored in the memory 166 and executable by the processor 233 are various application modules or programs such as, e.g., a lighting control module, application, or program 242 for automatically controlling light sources 103 as described herein and a feature identification (ID) module, application, or program 245 for processing and/or evaluation of images from the image capture device(s) 115 using, e.g., facial recognition, object detection, or other feature identification methods. Also stored in the memory 236 may be a data store 248 and other data that may be related to the target or feature of interest. In addition, an operating system 251 may be stored in the memory 236 and executable by the processor 233. It is understood that there may be other applications that are stored in the memory 236 and are executable by the processor 233 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages.

A number of software components are stored in the memory 236 and are executable by the processor 233. In this respect, the term "executable" means a program file that is in a form that can ultimately be run by the processor 233. Examples of executable programs may be, for example, a compiled program that can be translated into machine code in a format that can be loaded into a random access portion of the memory 236 and run by the processor 233, source code that may be expressed in proper format such as object code that is capable of being loaded into a random access portion of the memory 236 and executed by the processor 233, or source code that may be interpreted by another executable program to generate instructions in a random access portion of the memory 236 to be executed by the processor 233, etc. An executable program may be stored in any portion or component of the memory 236 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 236 is defined herein as including both volatile and nonvolatile memory and data storage components. Volatile components are those that do not retain data values upon loss of power. Nonvolatile components are those that retain data upon a loss of power. Thus, the memory 236 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although the lighting control module, application, or program 242, or feature ID module, application, or program 245, and/or other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the lighting control module, application, or program 242, or feature ID module, application, or program 245, and/or other application(s), that comprise software or code can be embodied in any non-transitory computer-readable medium for use by or in connection with an instruction execution system such as, for example, a processor 233 in a computer system or other control system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In some embodiments of the lighting system, the controller 118 and/or communications (or control) interface 121 can be configured to provide an automatic ON and OFF feature to conserve power when not in use. The lighting system can provide the ability to detect (e.g., via a motion sensor, thermal sensor, or camera(s) 115) when there are no people in the room or when there is no patient in the chair 109 (FIGS. 1A and 1B) for a predetermined or configurable period of time. When an individual enters the room, or sits in the chair, the lights can turn back on automatically thus eliminating the need to touch a switch (germ free) as well as providing an energy savings advantage. Still further, the lighting system can have the capability of being programmed such that the lights turn on and off at predetermined periods of time throughout the day, days of the week, or the like. For example, the lights can be programmed to automatically turn on in the morning when the office first opens, turn off during the lunch hour, turn back on when lunch is over, and then turn off again at the end of the day when the office is closed.

The light sources 103 include lighting assemblies that facilitate the adjustment and control of the beam of light 106 projected by the light source 103. Examples of these lighting assemblies and adjustment methods include but are not limited to "moving mirror" and "moving light" types of assemblies. In various embodiments, the light sources 103 utilizes LED (Light Emitting Diodes), halogen, quartz, laser, or other filament or non-filament based lighting to generate the light. LED lighting offers enhanced functionality and reliability of the light source 103. In addition to an extended lifetime, LED lighting provides advantages for the control of the light intensity and color temperatures.

Figure 3A:
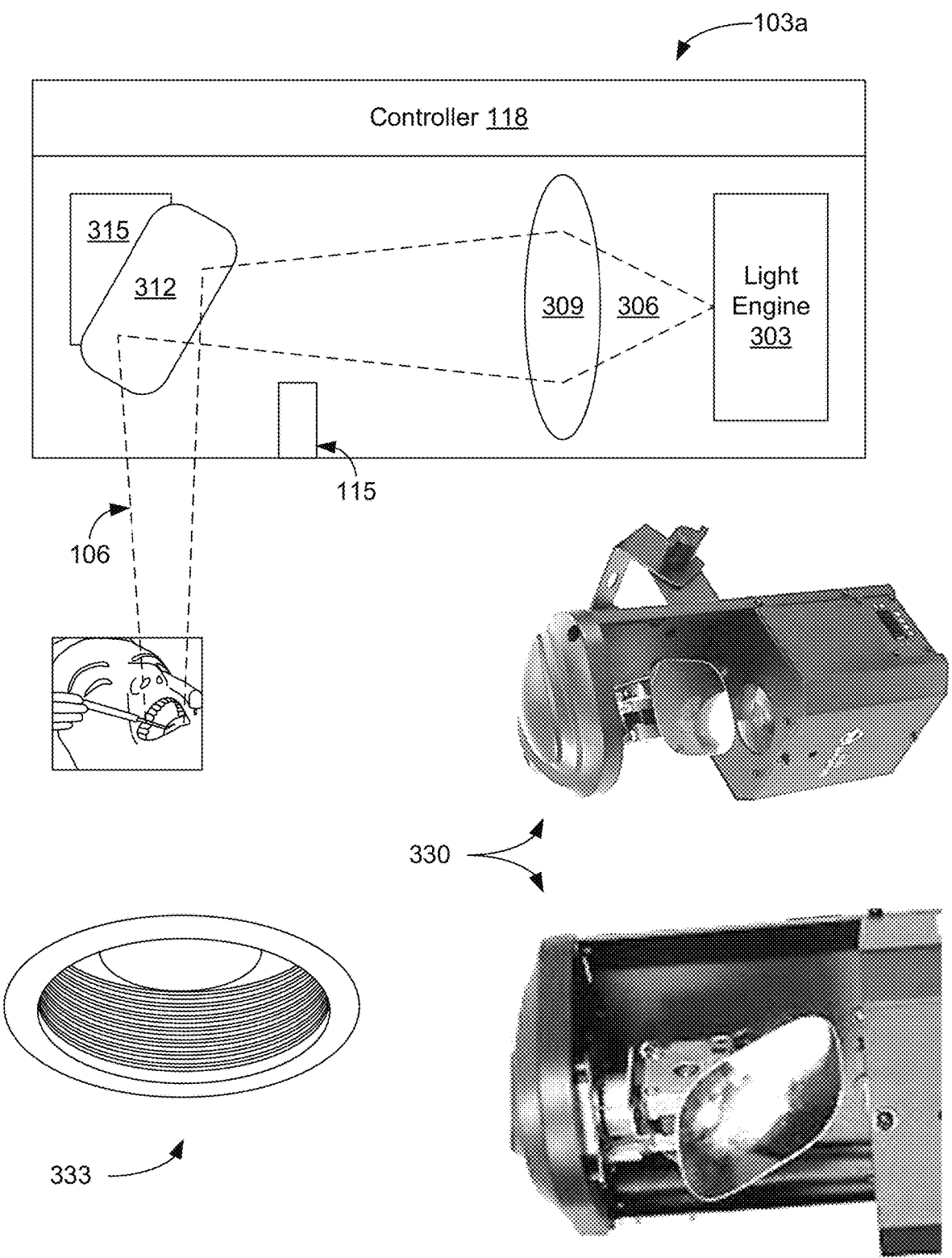
FIGS. 3A and 3B illustrate examples of light sources of the lighting system of FIGS. 1A and 1B, in accordance with various embodiments of the present disclosure.

Referring to FIG. 3A, shown is a schematic diagram illustrating an example of a moving mirror type of light source 103a. The light 306 from the light engine 303 passes through an optical assembly 309 onto a mirror 312, which can be moved by a mirror control mechanism 315 to direct the light 306 toward the target or feature of interest as the beam of light 106 as illustrated in FIG. 3A. The mirror control mechanism 315 can include one or more servo or stepper motor(s), a linear or screw-type adjustment mechanism, or any other type of position control method to control the position of the mirror 312 to maintain the beam of light 106 on the feature of interest. The amount of mirror adjustment will vary depending on the distance to (or depth of) the feature of interest from the light source 103a. The 3D information determined by the automatic calibration of the light source 103a can be used by the controller 118 to determine the appropriate amount of movement and adjustment needed to maintain the light beam 106 in position as the target and/or feature of interest moves. The controller 118 can adjust the mirror control mechanism 315 so that the beam of light 106 tracks the feature of interest.

The light source 103a can include a camera 115 that can provide images of the target or feature of interest for tracking and monitoring of the light provided by the light source 103a. The light source 103a can also include a controller 118 (e.g., master or slave controller 118*b* of FIG. 1B). FIG. 3A includes images 330 showing an example of a moving mirror light source 103*a*, and the mirror 312 and mirror control mechanism 315. When mounted in the ceiling 112 (FIG. 1A) of a room, the appearance of the moving mirror light source 103*a* can be similar to that of a standard recessed light as illustrated in image 333.

Figure 3B:
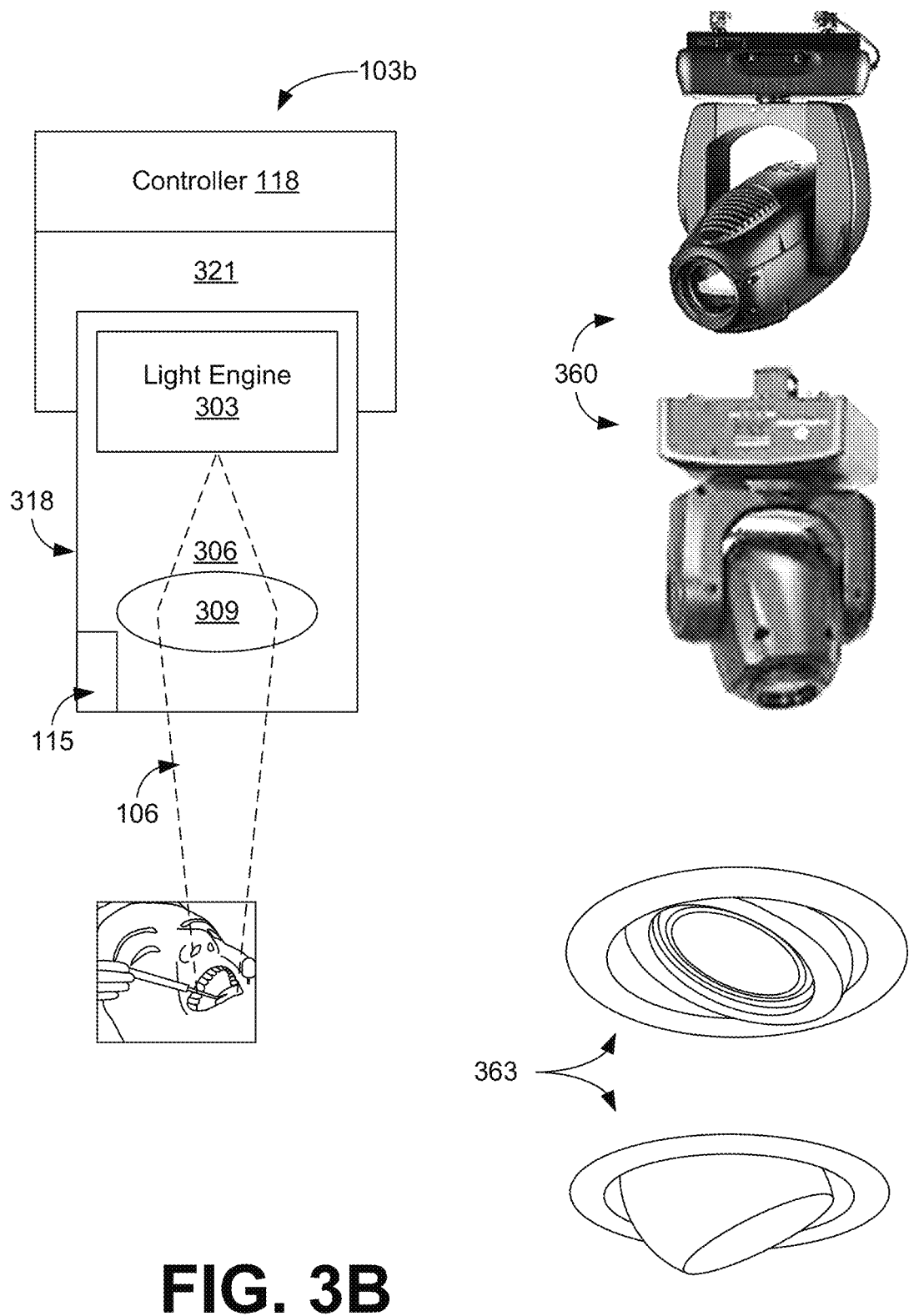

Referring next to FIG. 3B, shown is a schematic diagram illustrating an example of a moving light type of light source 103*b*. Like the moving mirror type light source, the moving light type light source 103*b* also includes a light assembly 318 comprising a light engine 303 for generating light 306 that is directed toward the feature of interest as the beam of light 106. The light 306 from the light engine 303 passes through an optical assembly 309 and is directed toward the feature of interest as the beam of light 106 based on the orientation of the entire light assembly 318. A light control mechanism 321 can include one or more servo or stepper motor(s), a linear or screw-type adjustment mechanism, or any other type of position control method to control the position of the light assembly 318 to maintain the beam of light 106 on the feature of interest. FIG. 3B also includes images 360 showing an example of a moving light source 103*b* that can be mounted to a ceiling 112 (FIG. 1A) of a room. FIG. 3B also includes images 363 showing an example of a moving light source 103*b* mounted in the ceiling 112 of a room, where the controller 118 and light control mechanism 321 are not visible from below.

For both the moving mirror type and moving light type of fixture, the amount of directional adjustment will vary depending on the distance to (or depth of) the target or feature of interest from the light source 103*b*. The 3D information determined by the automatic calibration of the light source 103*b* can be used by the controller 118 to determine the appropriate amount of adjustment needed to maintain the light beam 106 in position as the target or feature of interest moves. The controller 118 can then adjust the mirror control mechanism 315, or light control mechanism 321, so that the beam of light 106 tracks the feature of interest. Analysis of the images from the cameras 115 by the controller 118 can provide real-time or near real-time control of the lighting system.

In addition, as the focus of the light beam 106 is changed, the intensity of the light at the feature of interest will also be affected. The controller 118 can control the intensity of the light 306 generated by the light engine 303 to account for the changes in focus. Analysis of the images from the cameras 115 can be used to verify that the intensity and/or size of the light projected onto the feature of interest is correctly adjusted. The light source 103 can include a camera 115 that can provide images of the feature of interest for tracking and monitoring of the light provided by the light source 103. The light source 103 can also include a controller 118 (e.g., master or slave controller 118*b* of FIG. 1B).

There may be times when the automatic tracking of the target or feature of interest is not meeting the expectations of the operator. For example, if the light system is programmed to use the eyes of a patient as the target, and the feature of interest to be illuminated is the oral cavity, and the person is wearing an eye patch or eye glasses, the lighting system may not accurately detect the target and therefore cannot accurately aim the beams of light to properly illuminate the feature of interest. Therefore, the operator can activate manual operation of the light system and use a control interface to guide the beams toward the feature of interest. The communications interface 121 can include a joystick, knob, or other appropriate means of input for manual mode control 209. This provides a way for the operator (e.g., dentist or physician) to "manually override" the automatic light tracking ability as needed. If a foot controller is used (e.g., 124 of FIG. 1A), there could be a foot activated joystick 209 that the dentist or physician can use to override the system and manually move the beams of light 106 to the desired position, thus retaining the hands-free and germ free operation of the lighting system.

In some embodiments, the controller 118 can be configured to automatically adjust the output intensity of the beams of light 106 in response to changes in the ambient light of the operatory or surgical theater. For example, a lighting system that is installed in an operatory that has or is near a large amount of ambient lighting, such as windows or skylights, may need a varying level of illumination intensity throughout the day. The level of illumination needed in the early morning or late in the evening may be higher or lower than the level of illumination needed during the middle of the day when the sun is shining brightly. Further, rolling clouds can change the illumination requirements very rapidly at any time during the day. The lighting system can include ambient light sensors (e.g., photodetectors) that can measure or sense the ambient light level in the room. Based on these measurements, the controller 118 can automatically adjust the illumination provided by one, some, or all of the light beams to maintain a desired or constant level of illumination at the feature of interest. In some cases, the controller 118 can evaluate images from the cameras 115 to ensure that the intensity is adjusted appropriately.

As shown in FIGS. 3A and 3B, the light from the light engine 303 passes through the optical assembly 309 that can include lenses and/or filters for focusing and/or conditioning the light 306. For example, the optical assembly 309 can adjust the focus of the beam of light 106 using moveable lenses and/or cutoff filters to illuminate a smaller or larger area around the feature of interest. As the focus of the light beam 106 is changed, the intensity of the light at the feature of interest may also be affected. The controller 118 can control the intensity of the light 306 generated by the light engine 303 to account for the changes in focus. Analysis of the images from the cameras 115 can be used to verify that the intensity and/or size of the light projected onto the feature of interest is correctly adjusted.

Further, the optical assembly 309 can contain filters for changing the color temperature of the light and/or for composite-safe mode. These filters can be moved into and out of the beam of light originating from the light engine to change the color temperature or for composite-safe mode. Alternatively, LED lights can also produce colored light for mixing and blending of light to achieve the desired color temperature. If an LED light engine is used that contains both white and color LED's, the individual LED's can be energized and varied in brightness to provide a color mixing effect which would provide an infinite range of color temperature options as well as composite-safe mode operation. Analysis of the images from the cameras 115 can be used to verify that the color temperature and/or composite-safe mode light that is projected onto the feature of interest is correctly adjusted.

Further, the optical assembly 309 can be used to control and vary the shape or pattern of the light that is projected. A dentist or physician may desire to have a circular, square, rectangular, oval, or other pattern of light on the feature of interest. There are several methods which can be used to change the shape of the projected beam of light including but not limited to: using a cutoff filter which has a hole in the shape that is desired by the operator, or using an LED array and only illuminating those LED's which, when projected on a feature of interest, will form the desired shape, or using a lensing system that forms the light into the desired shape.

The lighting system can also be configured to convert the beam of light 106 from a focused spotlight to a wide angle area flood light or wash light. This can provide general lighting of the operating theater or examination room when the spotlight functionality is not in use or not required. In some implementations, the lighting system can automatically convert from the area flood light to a focused spotlight when a person enters the room, when a patient is detected, or when the operator commands or initiates the spotlight function via any number of different control methods such as a manual input through the communications interface 121 or through visual (e.g., gestures) or audio (e.g., voice) commands.

The lighting system may also be able to provide decorative lighting options. Logos, symbols, colors, and/or images which may be customizable by the manufacturer or designed specifically for individual customers can be included in the lighting system. Utilizing filters, screens, or color wheels (e.g., as part of the optical assembly 309), the light system can project a wide variety images on the floors and/or walls of the operatory. This can provide a fun, exciting, inviting space when the operatory is not in use by a patient or when the spot light feature is not in use. For example, in pediatric dentistry or children's dentistry, it may be aesthetically pleasing to have bubbles or flowers of various colors floating around and spinning on the walls and floor to help young children relax and have a positive experience at the dental office.

The lighting system can also include an energy storage element (e.g., an uninterruptible power supply or battery backup) that allows the lighting system to remain functional even if the primary source of power is interrupted. The energy storage element can provide a secondary source of power to provide emergency or reserve lighting capability in case of interruption of the electrical line service. This would allow a dentist or physician to complete a procedure, or reach a safe point in the procedure to stop, during an unexpected power outage.

By utilizing a plurality of automatic tracking light sources 103 at locations that provide a generous angle of incidence to the oral cavity or other feature of interest, shadowing caused by instrumentation held by the dentist is greatly minimized. For example, the light sources 103 can be located at a radial distance from the feature of interest that is about one half the vertical distance of the light sources 103 over the feature of interest. The angle of incidence at the illumination plane would be about 30 degrees, and could be in a range from about 15 degrees to about 45 degrees, or about 10 degrees to about 60 degrees. In addition, the tracking minimizes unnecessary movement by the dentist to try to position herself between the light source 103 and the oral cavity with the further benefit of not blocking the light emanating from the light source 103. This results in improved illumination of the feature of interest.

The automated lighting system that accurately tracks the feature of interest in real time (or near real time) eliminates the need to spread the lighting area to each side of the feature of interest, e.g., the oral cavity of a patient in a dentist chair. For example, if the patient moves their head or if the dental professional asks the patient to move or turn their head a certain way for ease of completing a procedure, the light source(s) 103 will automatically follow this movement by adjusting the beams of light 106 to maintain illumination of the oral cavity. As a result, the beam pattern can be designed to illuminate the oral cavity without any light being "wasted" to either side of the mouth. This results in a brighter illumination of the oral cavity while keeping the power requirements of the lighting sources 103 to a minimum for energy efficiency purposes.

With the light sources 103 of the lighting system mounted to the ceiling 112, or recessed into the ceiling 112, there is no need to have any type of supporting arm structure thereby eliminating the potential for any interference with any other equipment in the operatory. This results in a more open operatory design which provides a more comfortable and less cluttered environment for the patient and the dental professionals to work in.

The light sources 103 mounted in fixed positions in or adjacent to the ceiling 112, reduces or eliminates the possibility of drift, sag, bounce, and vibration issues. Ceiling mounted installation ensures that the beam or beams of light 106 will be steady when illuminating the feature of interest. In addition, the automatic calibration can compensate for any movement of the light sources 103. The small installation footprint and easy installation method without the need for any complicated and bulky supporting arm structures also reduces the overall cost of the system.

The automatic light sources 103 having a fixed mounting position eliminates the need to pass wires through a supporting arm structure, which greatly reduces the probability of wires yielding or shorting as a result of repetitive movement. The amount of movement in the light sources 103 of the light system is on the order of millimeters versus several feet as needed by traditional supporting arm lamps. This small movement improves wire integrity, reliability, and robustness of the lighting system.

In accordance with various implementations of the disclosed lighting systems, a method of operation can include receiving one or more images captured by one or more image capture devices 115. The images can be analyzed by one or more controllers 118 to identify a feature of interest (e.g., an oral cavity of a patient in a dentist chair) and/or a target positioned in relation to the feature of interest. For example, the target may be a pair of sunglasses that person is wearing while the feature of interest is the mouth of the person. The distance and orientation between the target and the feature of interest can be a known constant or can be calculated based on identifiable features within the image. In some implementations, an automatic calibration of the light source 103 can be performed to ensure accurate movement of the light source when illuminating and tracking the feature of interest.

Coordinates of the target and/or the feature of interest identified in the image can be output to, e.g., other controllers 118 of the lighting system. Other information can be output including, but not limited to, the relationship between the target and the feature of interest, the coordinates of a light spot in the image that was produced by a beam of light 106, and/or the 3D coordinates of the target or the feature of interest to be illuminated. One or more light source 103 can then be aimed using the output information to direct the beam(s) of light 106 onto the feature of interest. For example, a light source 103 can be repositioned by a controller 118 using the coordinates of the target, and/or the coordinates of the light spot, and/or the coordinates of the feature of interest to be illuminated. The 3D information of the feature of interest or target can be used to adjust the focus, size, and/or shape of the light beam 106 to concentrate the illumination on the feature of interest.

If one or more of the image capture devices 115 does not have a clear line of sight to the feature of interest or target, as long as at least one of the image capture devices 115 has a clear line of sight to the feature of interest or target, all of the beams of light 106 can move together based on the identified coordinates output by one or more controller(s) 118. For example, if a dentist leans over to look into a patient's mouth and partially blocks one or more of the image capture devices 115, the coordinates of the feature of interest or target can still be identified by the remaining image capture devices that still have a line of sight to the target or feature of interest and shared with all of the other light sources 103 so that they all move together, synchronically. As the feature of interest moves, the light sources 103 are repositioned to maintain the appropriate illumination of the feature of interest. The intensity of the different light sources 103 can also be adjusted to maintain a constant or near constant illumination of the feature of interest. By tracking the movement of individuals, the light sources 103 can be adjusted so the intensity of the illumination remains constant and avoids shadows on the feature of interest.

The proposed lighting system offers various improvements over conventional dental lighting systems. It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'". The term "substantially" means considerable in extent or largely but not wholly that which is specified. For example, two items would substantially overlap when they overlap by about 90%, by about 95%, or more.

Therefore, at least the following is claimed:
1. A lighting system, comprising:
a plurality of adjustable overhead light sources that are each supported by a wall or ceiling of a room and configured to project a corresponding beam of light, the plurality of adjustable overhead light sources each mounted at a different fixed location external to and above a subject, each of the plurality of adjustable overhead light sources configured to individually adjust orientation of the corresponding beam of light projected by that adjustable overhead light source independent of the other adjustable overhead light sources;
one or more image capture devices positioned external to and about the subject; and
a controller communicatively coupled to the plurality of adjustable overhead light sources and the one or more image capture devices, the controller configured to:
calibrate at least one overhead light source of the plurality of adjustable overhead light sources based upon at least one identifiable feature within one or more calibration images captured by the one or more image capture devices;
track a location of a target or a feature of interest of the subject based upon tracking images captured by the one or more image capture devices; and
in response to detecting a change in the location of the target, automatically adjust orientation of one of the corresponding beams of light projected from one adjustable overhead light source of the plurality of adjustable overhead light sources by independently adjusting the one adjustable overhead light source to direct the one corresponding beam of light from the one adjustable overhead light source at the feature of interest based upon the change in the location of the target or the feature of interest.

2. The lighting system of claim 1, wherein the controller is configured to analyze the tracking images captured by the one or more image capture devices to identify and track the location of the feature of interest.

3. The lighting system of claim 2, wherein the location of the feature of interest is a three-dimensional (3D) location.

4. The lighting system of claim 1, wherein the subject is an individual, and the feature of interest that the corresponding beam of light is directed at is an oral cavity of the individual.

5. The lighting system of claim 1, wherein the calibration of the at least one overhead light source comprises:
capturing an initial calibration image from at least one of the one or more image capture devices;
measuring a size of a known target within the initial calibration image; and
adjusting variables used by the controller to adjust depth, focus, or movement of the corresponding beam of light projected from the at least one overhead light source, where the variables are adjusted based at least in part upon the size measured from the initial calibration image and a corresponding known size of the known target.

6. The lighting system of claim 1, wherein the at least one identifiable feature comprises a dimension of a light spot produced by the corresponding beam of light projected from the at least one overhead light source.

7. The lighting system of claim 6, wherein the calibration of the at least one overhead light source comprises:
capturing an initial calibration image from at least one of the one or more image capture devices;
identifying a location of the light spot within the initial calibration image;
identifying a location of the target or the feature of interest within the initial calibration image;
determining an offset between the location of the light spot and the location of the target or the feature of interest; and
adjusting horizontal and vertical movement of the corresponding beam of light projected by the at least one overhead light source, wherein the horizontal and vertical movement of the corresponding beam of light by the at least one overhead light source is based upon the offset.

8. The lighting system of claim 1, wherein the at least one identifiable feature comprises a dimension of a known object within a field of view of the one or more image capture devices.

9. The lighting system of claim 1, wherein the controller is configured to:
   determine a dimension of an illumination area produced by the corresponding beams of light projected from at least a portion of the plurality of adjustable overhead light sources; and
   adjust a focus of at least one of the corresponding beams of light based upon the dimension of the illumination area.

10. The lighting system of claim 1, wherein the controller is configured to:
    determine a brightness of an identified illumination area produced by the corresponding beams of light by analyzing at least one of the one or more calibration images; and
    adjust intensity of the corresponding beams of light based upon the brightness.

11. The lighting system of claim 1, wherein the plurality of adjustable overhead light sources comprise one or more light emitting diodes (LED).

12. The lighting system of claim 1, wherein the plurality of adjustable overhead light sources are configured to illuminate the feature of interest in a composite-safe mode where wavelengths of light that promote hardening of composite materials are filtered out of the corresponding beams of light.

13. The lighting system of claim 1, wherein the plurality of adjustable overhead light sources are configured to adjust a color temperature of the corresponding beams of light.

14. The lighting system of claim 1, wherein the controller is further configured to:
    track movement of an individual located adjacent to the target or the feature of interest using the tracking images captured by the one or more image capture devices while tracking of the location the target or the feature of interest; and
    adjust intensity of the corresponding beams of light to maintain a consistent level of illumination of the feature of interest in response to the individual at least partially obscuring at least one of the corresponding beams of light.

15. A lighting system, comprising:
    one or more image capture devices suspended external to and above a subject, where the subject includes a feature of interest;
    a plurality of adjustable overhead light sources positioned external to and suspended above the subject, the plurality of adjustable overhead light sources distributed about the feature of interest, where individual light sources of the plurality of adjustable overhead light sources are configured to individually project a beam of light toward the feature of interest and independently adjust orientation of the beam of light projected by that individual light source toward the feature of interest, and where the individual light sources comprise a controller communicatively coupled to at least one image capture device of the one or more image capture devices and to at least one other controller of the individual light sources, the controller of the individual light sources configured to:
       analyze images obtained by the at least one image capture device when suspended external to and above the subject, the images analyzed to determine a location of a target or the feature of interest;
       communicate the location of the target or the feature of interest to the at least one other controller; and
       automatically adjust orientation of the individual light source comprising the controller to direct the beam of light projected by the individual light source towards the feature of interest in response to a change in the location of the target or feature of interest, where beams of light projected by the plurality of adjustable overhead light sources produce substantially uniform and shadow free illumination of the feature of interest.

16. The lighting system of claim 15, wherein orientations of at least a portion of the plurality of adjustable overhead light sources are automatically adjusted to direct the corresponding beams of light toward the feature of interest based at least in part upon the location of the target or the feature of interest communicated by the controller.

17. The lighting system of claim 15, wherein the controller of one of the plurality of adjustable overhead light sources is a master controller configured to coordinate operation of the plurality of adjustable overhead light sources via the controller of the individual light sources.

18. The lighting system of claim 15, wherein the plurality of adjustable overhead light sources are suspended over a dental chair, the subject is a patient in the dental chair and the feature of interest is an oral cavity of the subject.

19. A lighting system, comprising:
    one or more image capture devices suspended above a subject including a feature of interest;
    a plurality of light sources above the subject, the plurality of light sources distributed about the feature of interest, where individual light sources of the plurality of light sources comprise a controller communicatively coupled to at least one image capture device of the one or more image capture devices, wherein the controller is configured to:
       analyze images obtained by the at least one image capture device to determine a location of a target or the feature of interest;
       communicate the location of the target or the feature of interest to other controllers of the plurality of light sources;
       determine a relationship between the location of the feature of interest determined by the controller and a location of the feature of interest that was received from at least one other controller of the plurality of light sources; and
       adjust orientation of the individual light source to direct a beam of light produced by the individual light source towards the feature of interest in response to a change in the location of the target or feature of interest, where beams of light produced by the plurality of light sources produce substantially shadow free illumination of the feature of interest.

20. The lighting system of claim 19, wherein the controller of a second light source of the plurality of light sources is configured to direct the beam of light produced by the second light source towards the feature of interest using the location of the target or the feature of interest that was received from the controller.

* * * * *